A. WOODS.
SLACK ADJUSTER FOR BRAKES.
APPLICATION FILED SEPT. 10, 1915.
1,180,097.
Patented Apr. 18, 1916.
2 SHEETS—SHEET 1.
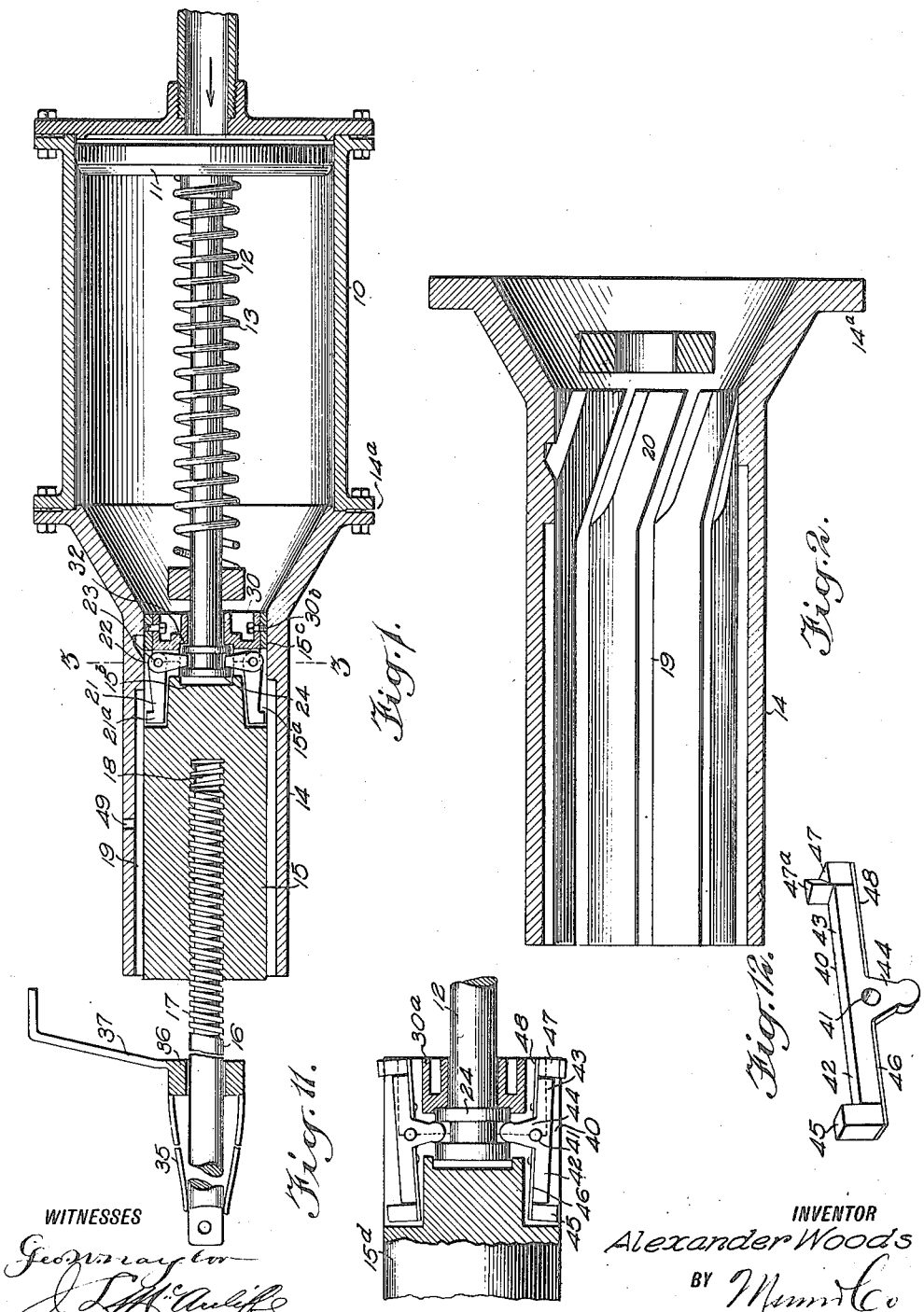
WITNESSES
INVENTOR
Alexander Woods
BY
ATTORNEYS

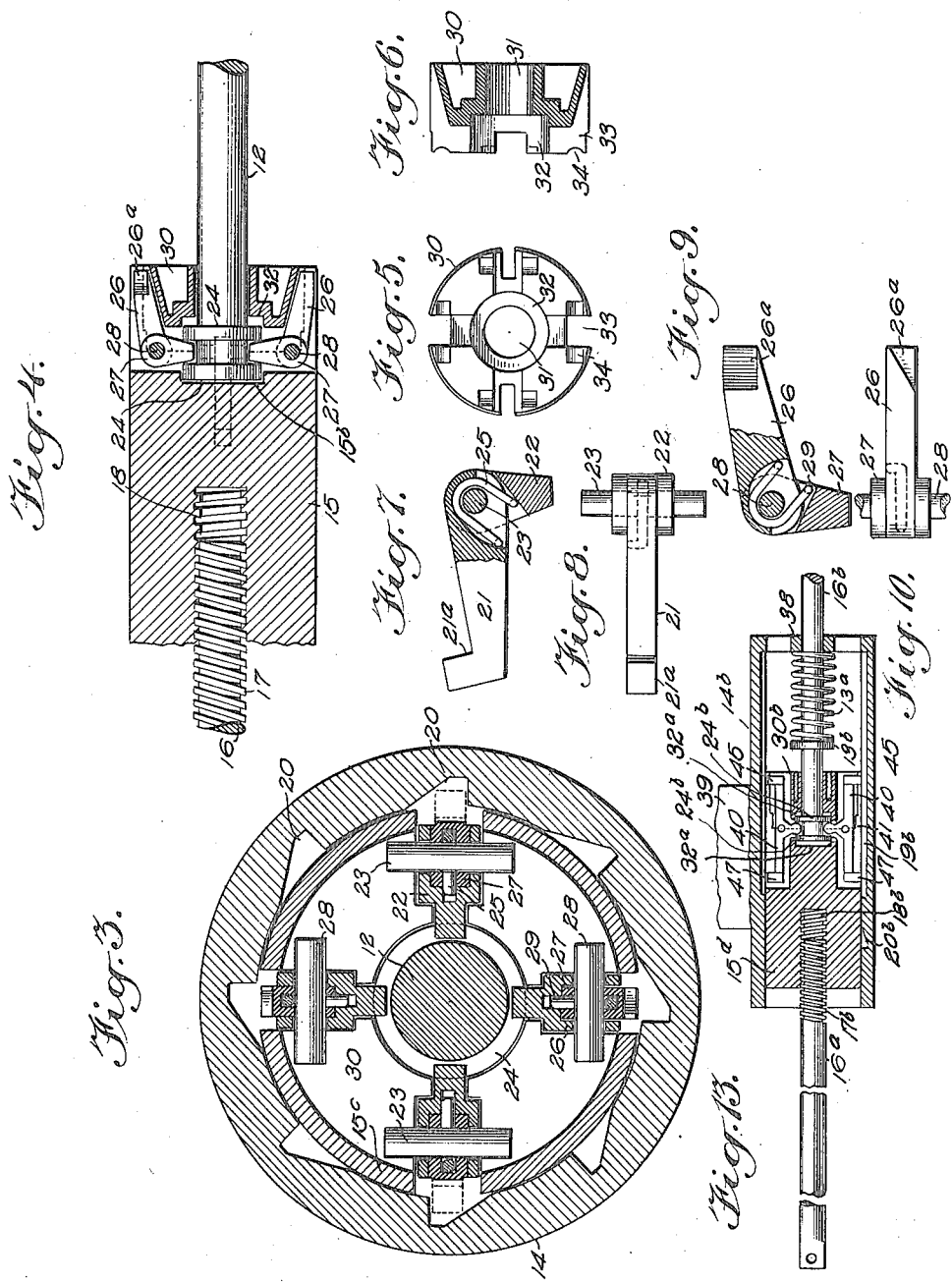

UNITED STATES PATENT OFFICE.

ALEXANDER WOODS, OF PUFFER, ALBERTA, CANADA.

SLACK-ADJUSTER FOR BRAKES.

1,180,097.   Specification of Letters Patent.   Patented Apr. 18, 1916.

Application filed September 10, 1915. Serial No. 49,991.

*To all whom it may concern:*

Be it known that I, ALEXANDER WOODS, a subject of the King of Great Britain, and a resident of Puffer, Province of Alberta, in the Dominion of Canada, have invented a new and Improved Slack-Adjuster for Brakes, of which the following is a full, clear, and exact description.

My invention relates to devices arranged to automatically function to adjust the slack between a brake-applying means and a brake rod, in the operation of the brake.

My invention relates particularly to means for the indicated purpose, whereby the brake rod and the slack adjusting means will have a non-turning, reciprocating movement in one direction in response to a movement of the brake-applying means, and upon an abnormal return stroke due to slack the slack adjusting means will be given a turning movement during a portion of said return stroke whereby to vary the total effective length of the brake rod to regulate the slack.

The invention will be particularly explained in the specific description following.

Reference is had to the accompanying drawings forming part of this specification, in which similar characters of reference indicate corresponding parts in all the views, and in which:

Figure 1 is a longitudinal vertical section of a slack adjusting means embodying my invention, showing the same applied; Fig. 2 is a longitudinal vertical section of a cylinder forming part of the slack adjusting means; Fig. 3 is a transverse vertical section on the line 3—3 Fig. 1; Fig. 4 is a view similar to Fig. 1 but omitting the cylinder, the section, however, being taken on a diametrical line at approximately right angles to that of Fig. 1; Fig. 5 is a front elevation; Fig. 6 is a longitudinal vertical section of a detail pertaining to the slack adjusting means, and to be hereinafter particularly referred to; Fig. 7 is a side elevation partly in section of a rockable device on the plunger controlled by the movement of the brake-applying means to co-act with guide means on the cylinder whereby to give the brake rod a non-turning reciprocating movement in one direction; Fig. 8 is a plan view of said rockable device; Fig. 9 is a view similar to Fig. 7, but showing a rockable device reversely disposed to engage guide means on the cylinder for giving the turning movement to the brake rod during part of its return stroke; Fig. 10 is a plan view of the device shown in Fig. 9; Fig. 11 is a detail view partly in longitudinal vertical section showing a modification of a rockable device to be substituted for those of Figs. 7 to 10; Fig. 12 is a perspective view of the device shown in Fig. 11; and Fig. 13 is a view similar to Fig. 1, but showing a reversal of certain parts in the brake adjusting means.

In constructing a practical embodiment of my invention, the same may be arranged in connection with the brake cylinder 10 of an air brake system, the same being equipped with a piston 11, the piston rod 12 of which is under the influence of a spring 13 to give a return stroke thereto after movement in response to air pressure.

A cylinder 14 is given support on the car as for instance by connection as at 14ᵃ with the cylinder 10. Operating in the cylinder 14 is a plunger 15 which receives the threaded end 17 of a brake rod 16 in the threaded bore 18.

I provide guide means on the cylinder 14 and plunger 15, whereby to give a turning movement to the plunger 15, during part of one stroke upon an abnormal movement of the brake cylinder piston, while giving a non-turning reciprocating movement to said plunger during the remainder of its movements. In the interior of the cylinder longitudinal grooves 19 are formed, and at an end of the cylinder spiral grooves 20 are formed. Movable with the plunger 15 are rockable guide devices presenting arms 21, 22, substantially in bell crank form. The said arms are broken or in effect articulated, being separately mounted on pins 23 in slots 15ᵃ of said plunger. Normally maintaining the arms of each rockable device in given angular relation, is a spring 25 presenting arms that engage at their ends in orifices in the respective pawl arms or otherwise having positive engagement therewith. At the free end of each arm 21 is a lug 21ᵃ at approximately a right angle to said arm, whereby to engage or disengage in a groove 19 as the device is rocked on its pivot pin 23 by a forward movement of the piston rod 12 of the brake applying means. Said piston rod 12 has spaced flanges or collars 24 which receive the arms 22. Thus a forward movement of the piston rod 12 will throw the lugs 21ᵃ into the grooves 19 and a return stroke of the rod 12 will withdraw the lugs 21$^a$ from the said grooves. On the plunger also, and set at quadrature to the arms 21, 22, is a second set of rockable devices presenting arms 26, 27, separately pivoted on pins 28 and under the influence of springs 29 corresponding with the springs 25 to maintain the arms 26, 27 of each device in given angular relation. On the free end of each arm 26 is a lug 26$^a$ to enter the spiral grooves 20 of the cylinder 14. The arms 26 are disposed in the opposite direction from the arms 21, the former being disposed rearwardly on the plunger 15 and the arms 21 being disposed forwardly, so that the engagement of the respective arms 22, 27 by the collars 24 will alternately rock the arms 21, 26 in opposite directions, whereby to engage the arms 21 with the cylinder when the arms 26 are withdrawn, and vice-versa.

The plunger 15 extends in the form of an annular flange 15$^c$ beyond the described rockable guide devices and within said flange is received a head 30 (best shown in Figs. 1, 5 and 6) which is removably secured by set screws 30$^b$, or equivalent means. The head 30 presents radial slots 33 to receive the adjacent rockable arms, and depressions 34 in which the pins 23, 28 are partially received, there being mating depressions in the plunger 15 to receive said pins. The head 30 has a central bore 31 for the passage of the piston rod 12 which has limited movement therethrough, and the collars 24 are accommodated in a depression 32 in the head 30 and a corresponding depression 15$^b$ in the plunger 15, the respective collars 24 having limited play in said depressions.

In operation, upon a forward stroke of the piston rod 12 its initial movement will rock the arms 23, 27 and will thus throw the arms 21 outwardly and the arms 26 inwardly. The lugs 21$^a$ will then travel in the longitudinal grooves 19 which are parallel with each other and parallel with the axis of the cylinder 14, and there will thus be a reciprocating movement imparted to the plunger 15 and brake rod 16 without any relative turning movement of the plunger and rod. Upon the reverse stroke of the piston rod 12, the initial movement will reversely rock the arms 21, 26, thus disengaging the arms 21 from the grooves 19 and engaging the lugs 26$^a$ of arms 26 in the said grooves. As the spiral grooves 20 are reached, the lugs 26$^a$ travel the length of the same and the plunger 15 will thereby be given a turning movement corresponding with the pitch of the said grooves 20, thereby forcing the brake rod 16 outwardly and thus increasing slightly its total effective length whereby to compensate for wear.

I prefer to apply brake pressure to the rod 16 in its movements, for which purpose brake springs 35 are arranged to bear thereon. The said springs may be secured to the car in any suitable manner, as by a collar 36 surrounding the said brake rod and having an arm 37 whereby to secure the same to any convenient portion of the car.

In Figs. 11 and 12 is shown a modification of the rockable guide device on the plunger 15, 15$^b$. The piston 12 is the same as in Fig. 1 with the flanges or collars 24, and rockable devices generally designated by the numeral 40 are mounted on pins 41, and present arms 42, 43 at opposite sides of the pivot, as well as a single inwardly extending arm 44 received between the collars 24. Mounted on the arm 42 corresponding with the arm 21, is a spring 46 carrying a lug 45 corresponding with the lug 21$^a$. On the arm 43 is a plate spring 48 carrying a block 47 presenting a lug 47$^a$ corresponding with the lug 26$^a$. A head 30$^a$ is employed substantially like the head 30 and suitably secured in position. The purpose of the springs 46, 48, and the springs 25, 29, is to enable the guide arms to yield in case they should be rocked outwardly when out of register with the grooves and thus be prevented from being forced into the wall of the cylinder.

The described arrangement of the parts, it will be seen effects a lengthening of the brake rod. In Fig. 13 the reverse arrangement of the guide elements is shown, which may be applied to a brake rod in which the brake is applied by a pull thereon. In this figure the brake rod 16$^a$ corresponds with the rod 16, and the section 16$^b$ of said brake rod constitutes the brake-applying means corresponding with the piston rod 12. The section 16$^b$ has collars 24$^b$ received in recesses 32$^a$ in the plunger 15$^d$ and head 30$^b$ and a head 38 of the cylinder 14$^b$ which is suitably supported on any member 39 of the car. In this construction rockable guide devices 40 are employed, and it is to be understood that they are constructed in all respects the same as the elements 40 with exactly the same appurtenances, these, however, being shown essentially diagrammatic in Fig. 13 as their detail construction is fully given in Figs. 11 and 12. The elements 40 are, however, reversed, the members 47 being disposed toward the brake rod 16$^a$ and the element 45 adjacent to the brake operating section 16$^b$.

The cylinder 14$^b$ has a longitudinal groove 19$^b$ and spiral grooves 20$^b$ the same as cylinder 14, and the plunger 15$^d$ has a threaded bore 18$^b$ to receive the threads 17$^b$ of the brake rod 16$^a$. The spring 13$^a$ corresponds with the spring 13 to give return movement to the plunger, said spring 13$^a$ abutting at one end against collar 13$^b$ on element 16$^b$ and abutting at its opposite end against head 38. The head 30$^b$ corresponding with head 30$^a$ provides for the movement of the element 16$^b$ in plunger 15$^b$ and for the removal of the said plunger when desired.

In operation, a pull exerted on the section 16ᵇ will move the plunger 15ᵈ; the initial movement of the plunger will be relative to the brake rod section 16ᵇ, and so rock the elements 40 as to throw members 45 outwardly into the grooves 19ᵇ. Upon a reverse movement of the brake-applying member 16ᵇ, and plunger 15ᵈ, the reverse movement of elements 40 will take place and the members 47 will be thrown out to enter the spiral guide grooves on the cylinder and turn the plunger relatively to the brake-applying member 16ᵇ, thus shortening the total effective length of the brake rod and thereby taking up slack. It is to be noted that one side wall of the grooves 20, 20ᵇ is made sloping to insure the proper engagement and disengagement of the rockable guide devices.

In practice, lubrication may be effected in any suitable manner; I have shown an oil hole 49 in Fig. 1.

Having thus described my invention, what I claim as new and desire to secure by Letters Patent, is:

1. A slack adjuster for brakes, including a cylinder, a brake rod, reciprocating brake-applying means for actuating said brake rod, a reciprocating plunger in said cylinder movable in opposite directions by the brake-applying means and having threaded engagement with the brake rod, said brake applying means having a limited reciprocating movement relatively to the plunger, and means to give a turning movement to the plunger relative to the brake rod while reciprocating in one direction and causing a non-turning reciprocating movement during the remaining movements of the plunger and rod, said last-mentioned means being normally inoperative and being rendered operative by a movement of the brake-applying means relatively to the plunger and functioning by an abnormal movement of the brake-applying means.

2. In a slack adjuster for brakes, brake devices including a brake-rod, brake-applying means mounted to reciprocate to actuate the brake devices, and having a limited reciprocating movement relative to said brake devices, slack-adjusting means including an element interposed between said brake-applying means and brake-rod and connected with one of the same by a threaded connection, and means to turn said element, said last-mentioned means being movable by a relative movement of the brake-applying means and brake devices to a position to turn said interposed member and acting when thus positioned, to turn said interposed member by a reciprocating movement of the brake-applying means.

3. A slack adjuster for brakes, including a brake rod, brake-applying means, an element having threaded engagement with the brake rod and mounted to be reciprocated in opposite directions by the brake-applying means, the brake-applying means having a limited movement relatively to the said element, and means to turn the said element relatively to the brake rod in reciprocating in one direction, said last mentioned means being rendered operative by a movement of the brake-applying means relatively to the said element.

4. A slack adjuster for brakes, including a cylinder, a brake rod, brake-applying means, a reciprocating plunger in said cylinder movable in opposite directions by the brake-applying means and having threaded engagement with the brake rod, the said cylinder having guide grooves therein parallel with the axis of the cylinder for part of the length of the cylinder and having spiral guide grooves therein for another part of its length, and guide members on the plunger movable alternately by the brake-applying means into the respective grooves.

5. A slack adjuster for brakes, including a cylinder, a brake rod, brake-applying means, a reciprocating plunger in said cylinder movable in opposite directions by the brake-applying means and having threaded engagement with the brake rod, the said cylinder having guide grooves therein parallel with the axis of the cylinder for part of the length of the cylinder and having spiral guide grooves therein for another part of its length, members rockably mounted on the plunger and each presenting arms in angular relation to each other, and spring means normally tending to maintain the arms of a member in a given relation yieldable to undue resistance, said members being rockable in opposite directions by the brake-applying means in the applying and releasing movements of the latter.

6. A slack adjuster for brakes, including a cylinder, a brake rod, brake-applying means, a reciprocating plunger in said cylinder movable in opposite directions by the brake-applying means and having threaded engagement with the brake rod, the said cylinder having guide grooves therein parallel with the axis of the cylinder for part of the length of the cylinder and having spiral guide grooves therein for another part of its length, and members rockably mounted on the plunger, each member presenting arms in angular relation to each other, the said members being rockable in opposite directions by the brake-applying means in both the applying and releasing movements of the latter.

7. A slack adjuster for brakes, including a cylinder, a brake rod, brake-applying means, a reciprocating plunger in said cylinder movable in opposite directions by the brake-applying means and having threaded engagement with the brake rod, the said cylinder having guide grooves therein for another part of its length, and rockably mounted devices movable in opposite directions, by the brake-applying means in the applying and releasing movement of the latter, into and out of said grooves.

8. A slack adjuster for brakes, including a cylinder, a brake rod, brake-applying means, a reciprocating plunger in said cylinder movable in opposite directions by the brake-applying means and having threaded engagement with the brake rod, the said cylinder having guide grooves therein parallel with the axis of the cylinder for part of the length of the cylinder and having spiral guide grooves therein for another part of its length, and guide members on the plunger movable alternately by the brake-applying means into the respective grooves, said brake-applying means having a limited reciprocating movement relatively to the plunger to operate the guide members and a further reciprocating movement to actuate the plunger.

9. In a slack adjuster for brakes, brake devices including a brake-rod, brake-applying means, mounted to reciprocate to actuate the brake devices and having a limited reciprocating movement relatively to the said brake-rod, and slack-adjusting means normally out of operative position and movable to operative position by a relative movement of the brake-applying means and brake-rod and adapted to be reciprocated with the brake-applying means to take up slack after being thus positioned by the said relative movement of the brake-applying means and brake-rod.

In testimony whereof I have subscribed my name to this specification in the presence of the subscribing witnesses.

ALEXANDER WOODS.

Witnesses:
L. A. COREY,
O. D. COCHRAN,
W. FAIRBAIRN.